United States Patent [19]
Shakib et al.

[11] Patent Number: 5,812,793
[45] Date of Patent: Sep. 22, 1998

[54] SYSTEM AND METHOD FOR ASYNCHRONOUS STORE AND FORWARD DATA REPLICATION

[75] Inventors: Darren Arthur Shakib, Redmond; Scott Norin, Newcastle; Max Loell Benson, Redmond, all of Wash.

[73] Assignee: Microsoft Corporation, Redmond, Wash.

[21] Appl. No.: 673,741

[22] Filed: Jun. 26, 1996

[51] Int. Cl.⁶ .......................... G06F 13/42; G06F 15/177; G06F 7/20

[52] U.S. Cl. ................. 395/200.31; 395/200.35; 707/8; 707/201

[58] Field of Search .................. 395/182.04, 200.31, 395/200.34, 200.35, 200.43, 200.44, 200.47, 200.48, 200.59, 200.78, 683, 712, 726, 200.76; 707/8, 202, 203; 370/390

[56] References Cited

U.S. PATENT DOCUMENTS

| | | | |
|---|---|---|---|
| 5,220,657 | 6/1993 | Bly et al. | 395/200.35 |
| 5,261,069 | 11/1993 | Wilkinson et al. | 707/8 |
| 5,440,730 | 8/1995 | Elmasri et al. | 707/203 |
| 5,544,353 | 8/1996 | Forman et al. | 395/736 |
| 5,581,754 | 12/1996 | Terry et al. | 707/8 |
| 5,588,147 | 12/1996 | Neeman et al. | 395/200.31 |
| 5,600,834 | 2/1997 | Howard | 395/712 |
| 5,613,113 | 3/1997 | Goldring | 707/202 |
| 5,627,961 | 5/1997 | Sharman | 395/182.04 |
| 5,649,195 | 7/1997 | Scott et al. | 395/200.76 |
| 5,678,040 | 10/1997 | Vasudevan et al. | 707/8 |
| 5,715,454 | 2/1998 | Smith | 707/203 |

OTHER PUBLICATIONS

Martin, J.; Design and Strategy for Distributed Data Processing; Chapters 19–20 pp. 272–306; Prentice–Hall, USA; ISBN 0–13–201657–5, 1981.

Yavin, D. "Replication's Fast Track," *BYTE*, Aug. 1995, pp. 88a–88d, 90.

*Primary Examiner*—Mark H. Rinehart
*Attorney, Agent, or Firm*—Workman Nydegger Seeley

[57] ABSTRACT

A system and method for asynchronous store and forward data replication is presented. The system and method utilizes one-way, unacknowledged communication messages between systems in a computer network to transfer locally modified data to other systems having a copy of the data. The asynchronous store and forward data replication system and method utilizes existing computer networks and/or network control software as a transport agent to deliver the communication messages. Utilization of one-way, unacknowledged communication messages allows data replication across foreign networks such as the Internet or other wide area networks.

17 Claims, 3 Drawing Sheets

SYSTEM AND METHOD FOR ASYNCHRONOUS STORE AND FORWARD DATA REPLICATION

BACKGROUND OF THE INVENTION

1. The Field of the Invention

The present invention relates to systems and methods for replication of data, that is, broadcasting changes (e.g., creation of new data, modification of existing data or deletion of existing data) made locally at one server to a specified list of other remote or locally connected servers. More specifically, the present invention relates to systems and methods for asynchronous store and forward data replication using one-way, unacknowledged communications between one or more other servers in a computer network.

2. The Relevant Technology

Today, business and technology trends are changing the way we use computers and information. The personal computer or PC has become the standard business information tool as prices have decreased and computing power has increased. In record numbers, businesses are reengineering their organizational structure and processes to become faster and more competitive, in addition to being better able to use the wealth of information resources available today. Never before has there been so much information so readily available nor such high expectations for how much the individual will be able to accomplish by utilizing this information. The result is that people today need access to information everywhere, anytime. In June 1994, Microsoft announced a new product designed to meet these needs, called Microsoft® Exchange.

The main concept behind Microsoft® Exchange is to provide a product that integrates E-mail, scheduling, electronic forms, document sharing, and other applications such as customer tracking to make it altogether easier to turn information into a business advantage. The result is that users can access, organize, and exchange a world of information, wherever they happen to be in the world— whether from the office, the home, or while traveling on the road. In essence, a main barrier to PC-based communication, namely, accessibility and sharing by multiple parties of up-to-the-minute information, has now been significantly reduced.

With the increased accessibility and sharing of information between multiple users, it is now more common than ever for such multiple users to simultaneously or in tandem work on shared data set objects, as for example word processing documents, spreadsheets, electronic forms, E-mail messages, graphics images or a host of other such data objects. With such shared use of data objects among multiple users of a computer network (sometimes referred to as an "enterprise"), there arises the need for each user to keep all other users of the same data object or the same set of data objects apprised of changes that are locally made by that user. This need gives rise to a process called replication of data, that is, transferring changes made locally (e.g., creation of new data, modification of existing data or deletion of existing data) at one server to a specified list of other remote or locally connected servers. Such replication processes in turn require systems and methods for accurately keeping track of replication data transferred from one server to one or more other servers, and for preventing loss of information or quickly and efficiently recovering lost or missing replication data.

In the past, several approaches have been taken to replication of data. One popular class of replication systems rely on every server talking explicitly to every other server. This approach, generally referred to as "point-to-point" replication, requires a fully connected replication topology. A fully connected replication topology in turn requires a physical communication link between a server and each and every other server in the network. Such a fully connected replication topology allows a single server to talk to each and every other server directly.

In a point-to-point replication system, when a server has information which should be replicated, the server initiates a two-way communication dialog with each and every other server in the replication topology, one after the other. During the dialog, the server transferring information will send the information to the recipient server and then wait for the recipient server to acknowledge proper reception of the transferred data. When all data has been transferred and acknowledged in this manner, the server will then break the communication dialog and initiate another communication dialog with the next server in the replication topology.

Point-to-point replication systems work quite well with small replication enterprises. However, as is apparent from the above description, point-to-point replication is message intensive and requires a large communication bandwidth between servers. Thus, as the number of servers in the replication enterprise grows, the point-to-point replication process degrades rapidly and the network capacity is soon exceeded. Because of this characteristic, a point-to-point replication system is generally considered to be unworkable for a replication enterprise with a large number of servers. With the explosive growth of large scale networks which may contain hundreds, thousands, or possibly hundreds of thousands of systems, such an approach seems to be of very limited value.

In order to overcome some of the limitations of a point-to-point replication system, other replication systems which rely on a specific replication topology have been developed. One such replication topology utilizes a central server or "hub" connected to a plurality of other servers sometimes called satellites. In such a system, when a satellite has information to be distributed to other satellites connected to the hub, the server transfers the message to the hub and allows the hub to distribute the information to the other satellites. As the number of servers in the network increases, more hubs are added. The hubs are then interconnected so that data may flow from a satellite connected to one hub to another satellite connected to a separate hub.

Although the use of hubs and specially configured topologies helps alleviate some of the problems encountered in a point-to-point replication system, such systems force users to purchase specialized hardware and configure their network in predefined topologies. In particular, such topologies do not allow large scale peer-to-peer communication where all systems in an enterprise are the same and the use of hubs is not required. Topologies requiring hubs may not fit the needs or budget of a particular customer. Systems which rely on special hardware or topologies, then, do not provide the flexibility demanded by many customers.

Another significant problem with current replication systems is that they require a specific type of network. In both the point-to-point and hub routed replication systems, two-way communication dialogs are usually used. Thus, it is impossible for these systems to replicate data over certain types of networks which use foreign communication protocols or which generally only support one-way communications. For example, current replication systems cannot use networks such as the Internet to replicate data.

Thus, there currently does not exist a replication system which provides needed flexibility for the user. In particular, there does not exist a replication system which can take advantage of currently installed hardware and network configurations and which also allows growth of a replication enterprise to accommodate a virtually limitless number of systems. There also does not currently exist systems and methods which allow the foregoing to operate together in a peer-to-peer environment. Finally, there does not currently exist a replication system that can replicate data over foreign networks such as the Internet or other wide area networks supporting only one-way communications.

SUMMARY AND OBJECTS OF THE INVENTION

1. Glossary of Terms

In order to assist in more easily understanding the terminology used in the following detailed description and summary of the invention, the following definitions for key terms is provided:

Asynchronous store and forward replication: A process of replicating data throughout a network or enterprise by broadcasting locally made changes (e.g., creation of new data, modification of existing data, or deletion of existing data) to a specified list of servers (called replica nodes) which contain copies of the data. Communications in store and forward replication are one-way and there is no acknowledgment of receipt of messages containing the changes.

Backfill: A discovery based data recovery process by which changes held by other servers (called replica nodes) but not held locally are recovered so that the copy of the data set (called a replica) held locally is the same as replicas held by other replica nodes.

Change number: A unique identifying code used to identify a particular change made to a particular data object by a particular replica node.

Change range: A range of changes, identified by a minimum and maximum change number. The change range is inclusive of the minimum and maximum change number.

Change set: The set of change ranges that defines the changes available for a given replica of a data set on a given replica node. The change set contains changes made on the local replica node and changes to the data set received from other replica nodes through the replication process.

Data set: A set of objects which can be replicated. In one sense a data set can be thought of as a container with various data set properties which holds or stores data objects, much like a folder contains documents. A populated data set includes the data objects, while an unpopulated data set does not have any associated data objects and only refers to the data set properties.

Data set list: A list of the data set properties for the data sets being replicated across the enterprise. In one sense a data set list can be thought of as a container which holds or stores data sets (as defined by their data set properties).

Data set properties: A set of information that describes a data set. Data set properties can include such information as a name and/or ID value, and a list of servers which have the contents of a data set (the replica list).

Enterprise: The set of servers (or replica nodes) comprising the replication environment.

Replica: A local copy of a particular data set replicated on one or more replica nodes throughout the network.

Replica list: A list of all replica nodes on the network containing a replica of a particular data set Replica node: A server or other location on the network where a copy of a data set (called a replica) or other replica object resides.

Replica object: An object or group of objects which can be replicated. This term includes at least, individual data objects and data set properties.

Site: A plurality of replica nodes in which each node is relatively similar in terms of cost to access data, as compared to the cost between sites. Cost is representative of factors such as the monetary cost to obtain data, the speed of obtaining data, and the reliability of obtaining data.

2. Brief Summary

The foregoing problems in the prior state of the art have been successfully overcome by the present invention, which is directed to a system and method for asynchronous store and forward replication to replicate data among multiple systems connected together on a computer network. The store and forward replication system and method of the present invention utilizes existing networking hardware and networking control software as a delivery system to deliver one-way, unacknowledged message packets to other systems in the network in much the same way that people use E-mail packages to deliver messages to others. The current system and method can utilize virtually any type of existing network and preserves client investment in networking hardware and networking control software. The current system and method can be used to replicate any type of information.

In a store and forward replication process, each server keeps track of locally made changes to a particular copy of a replication data set (sometimes referred to as a "replica") which contains one or more data objects. Each server periodically broadcasts the new locally made changes (e.g., creation of new data, modification of existing data, or deletion of existing data since the last replication interval) to all other servers with a copy of the same replication data set. The group of other servers also having copies of the data set is kept on a "replica list." The changes are preferably broadcast in the form of an updated copy of the changed data objects. This allows each server to update the local replica as changes are received by replacing the older versions of the data objects with the newer versions of the data objects.

The present invention uses IDs that are unique across the network to track various items. In accordance with the present invention, each server has a unique ID which distinguishes it from all other servers in the network. Furthermore, all data sets and individual objects which make up the data sets also have unique IDs which allow them to be tracked throughout the network. In the case of individual data objects, when changes are made to the data object, the data object is also assigned an ID representing the current change version in order to distinguish different versions of the data object throughout the network.

In addition to replication of data objects, a preferred embodiment also replicates "properties" of data sets. Properties of data sets can include an identifier such as the name and/or ID of the data set, access privilege information such as a list of users which can access or change the contents and/or properties of the data set, and a list of servers which contain a replica of the data set (e.g. the replica list for the data set). Since the properties of a data set and the contents of the data set can be replicated independently, a server can receive the properties of a data set and not receive the contents of the data set. Such a situation is analogous to receiving the data set container without the data set objects to fill the data set container. Servers which have a copy of the data set objects, however, also need the data set properties (or container) to associate with the copies of the data set objects.

Properties can be replicated to some or all of the servers in the network. By replicating these properties to servers in the network, the servers will have a list of data sets which are available, who can access the data sets, and where populated copies of the data sets can be found. It is presently preferred that all servers have the data set properties. Users with sufficient access privileges connected to any server can then be given information about the data sets and allowed to access the data sets, either directly on the local server if a replica of the accessed data set resides locally, or indirectly through another server if a replica of the accessed data set is not kept locally.

Accordingly, it is a primary object of this invention to provide a system and method for asynchronous store and forward data replication which replicates data across a computer network.

Another primary object of this invention is to provide a system and method for asynchronous store and forward data replication which can take advantage of currently installed network hardware and network configurations.

Another important object of the present invention is to provide a system and method for asynchronous store and forward data replication which allows growth of the replication enterprise to accommodate a virtually limitless number of systems without significant degradation of the replication process.

It is a further object of the present invention to provide a system and method for data replication which operates in a peer-to-peer environment.

Yet another central object of the present invention is to provide a system and method for asynchronous store and forward data replication which can replicate data over foreign networks such as the Internet or other wide area networks supporting only one-way communication.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

In the following detailed description, the present invention is described by using flow diagrams or structure diagrams to illustrate either the processing or the structure that is presently preferred to implement the system and method of the present invention. Using this manner to present the present invention should not be construed as limiting of its scope. The present invention contemplates both methods and systems for asynchronous store and forward data replication. The presently preferred embodiment of a system for asynchronous store and forward data replication comprises a general purpose computer. The currently disclosed system, however, can also be used with any special purpose computer or other hardware system and all should be included within its scope.

Embodiments within the scope of the present invention also include articles of manufacture comprising program storage means and having encoded therein program code means. Such program storage means can be any available media which can be accessed by a general purpose or special purpose computer. By way of example, and not limitation, such program storage means can comprise RAM, ROM, EEPROM, CD-ROM or other optical disk storage, magnetic disk storage or other magnetic storage devices, or any other media which can be used to store the desired program code means and which can be accessed by a general purpose or special purpose computer. Combinations of any of these example program storage means are also contemplated within the scope of this invention.

Program code means comprises, for example, executable instructions and data which cause a general purpose or special purpose computer to perform a specific function or functions.

Figure 1:
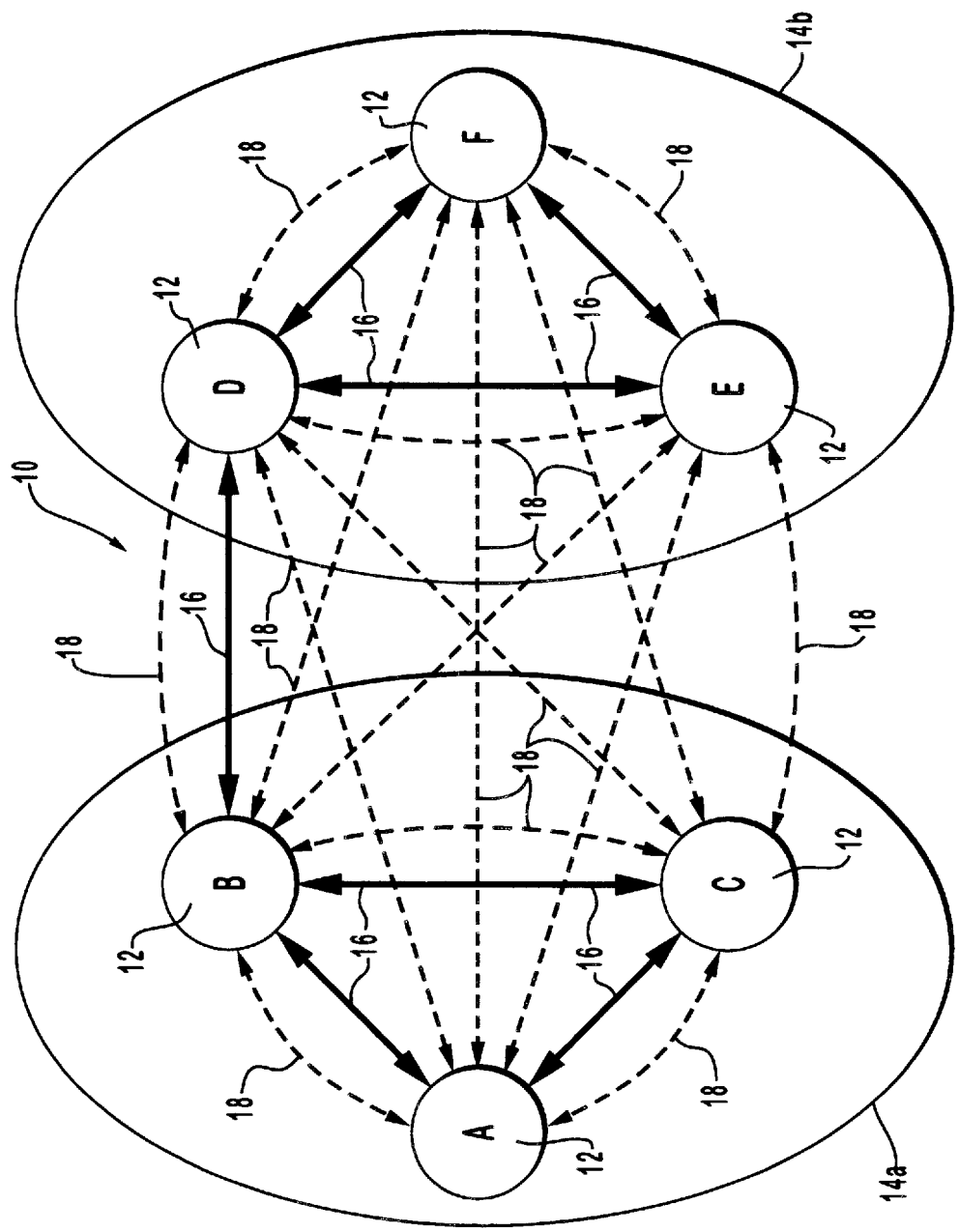
FIG. 1 is a representation of the topology of an example replication enterprise.

Turning now to FIG. 1, an example of a network, referred to as a "replication enterprise" or simply an "enterprise," is shown generally as 10. In a store and forward replication process, a given populated data set, referred to as a "replica," and/or a given unpopulated data set, referred to as "data set properties" is replicated at one or more locations in the enterprise. In FIG. 1, the locations where a replica or data set properties can reside are referred to as "replica nodes" and are shown as 12 and labeled A–E. The term "replica node" is preferred to the term "server" since "server" often implies a system which serves one or more desktop, laptop, or other computers. Replica nodes include not only servers in the traditional sense of the term, but also desktop, laptop, or any other system where a copy of a replica may reside.

In the context of this invention, the term "replica" will be used to refer to a specific copy of a set of one or more data objects which are to be replicated as a unit across one or more replica nodes. The terms "replica" and "data objects" are intended to be read broadly and encompasses any type or format of data to be replicated, including spreadsheets, documents, E-mail messages, files, data set properties, and the like. "Unpopulated data set" or "data set properties" refer specifically to data sets without the data objects. The term "replica objects" will be used to refer broadly to either data objects or data set properties.

In the enterprise, replica nodes may be grouped into "sites." A site is a plurality of replica nodes with relatively similar costs to access data. Replica nodes within a site are generally, but not necessarily, located in a relatively localized geographic area and have high speed connectivity between nodes, such as, for example, Local Area Network (LAN) connections. The cost to access data between sites is generally much greater than the cost to access data within a site. Site groupings are typically assigned by a system administrator. FIG. 1 shows two sites designated 14a, consisting of replica nodes A, B, and C, and 14b, consisting of replica nodes D, E, and F.

Replica nodes are connected by physical network connections. In FIG. 1, the physical network connections 16 are illustrated by the solid lines. As shown in FIG. 1, all replica nodes 12 may not be fully connected to every other replica node by physical network connections 16 (note that site 14a containing the A–B–C group is connected to site 14b containing the D–E–F group only by a single physical network connection). All that is required for this invention, however, is that the physical connections be sufficient to provide either a direct or indirect data flow path between each of the replica nodes. Furthermore, a key advantage of the present invention is that physical connections 16 may be of any type. For example, the physical connections between replica nodes A, B, and C may be a LAN or other high-speed link, while the connection between replica nodes B and D may be a slower dial-up, Internet, Wide Area Network (WAN), or other long-haul connection. In accordance with the present invention, the physical connections between replica nodes must only be sufficient to handle one-way, unacknowledged communication messages between replica nodes.

By ensuring a data flow path between each of the replica nodes, the entire enterprise is logically fully connected even though the physical connections are of arbitrary topology. In FIG. 1, the logical network connections forming the fully connected logical topology are illustrated by dashed lines 18.

Figure 2:
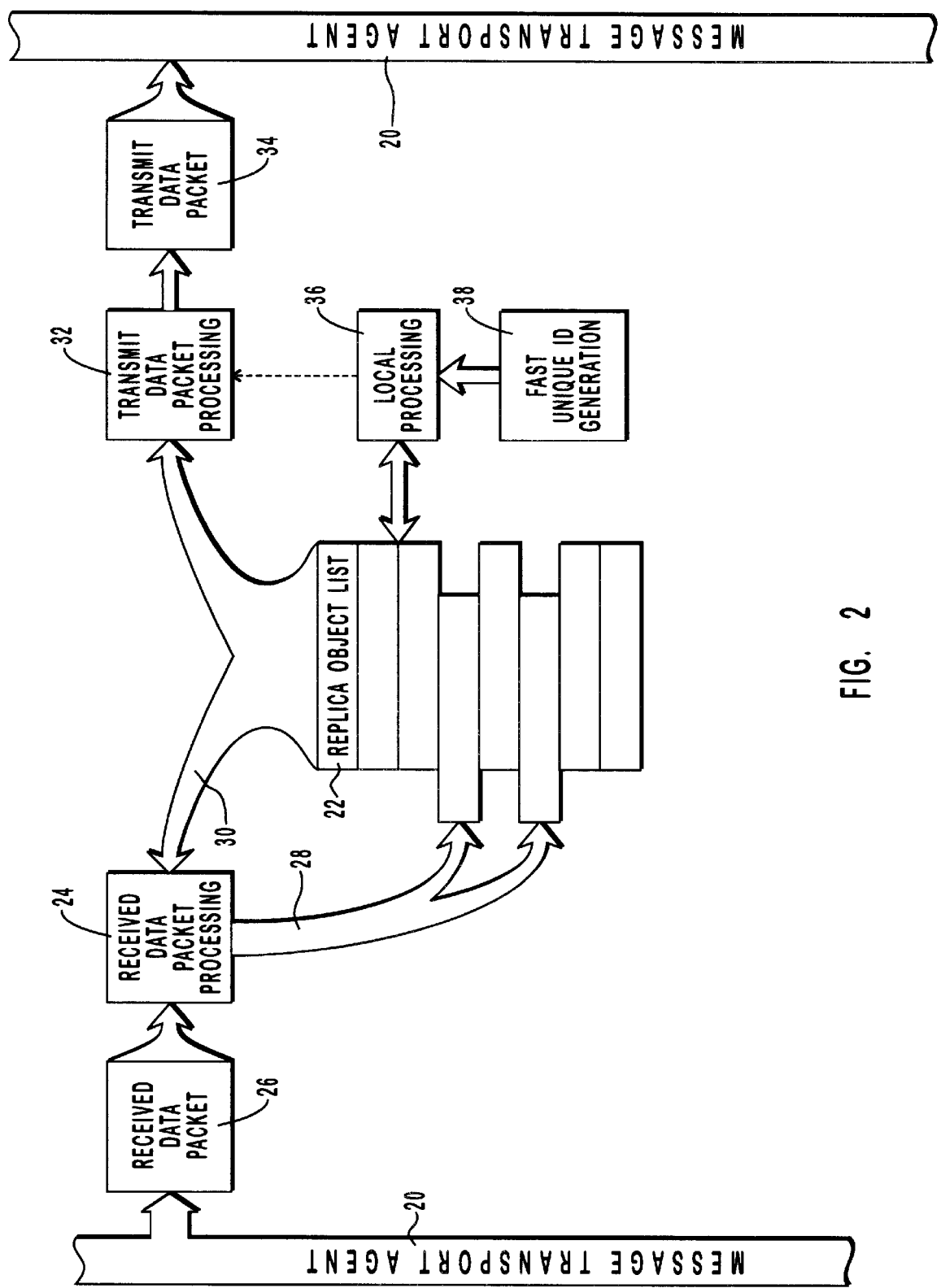
FIG. 2 is a top-level diagram illustrating the basic components of the store and forward data replication process of the present invention.

Turning next to FIG. 2, a top level diagram presenting the structure of one preferred embodiment is presented. By now it should be apparent that the asynchronous store and forward data replication system and method of the present invention is a layered product. In other words, the asynchronous store and forward system and method of the present invention utilizes existing network hardware and control software as a Message Transport Agent (MTA). In FIG. 2, such existing network hardware and networking control software is illustrated by message transport agent 20.

As previously discussed in conjunction with FIG. 1, the physical network connections 16 must be capable of delivering one-way, unacknowledged communication messages. One-way, unacknowledged communication messages means that the store and forward replication process delivers a message to be transferred to the MTA and does not receive feedback as to the success of the transfer. Thus, the store and forward data replication process of the present invention has been designed around the presumption that no acknowledgement or feedback is required when messages are transferred between replica nodes. This feature of the present invention provides a substantial benefit over prior art replication systems and methods. Because prior art systems and methods require two-way data communication between systems in the network, they cannot be used with networks which have foreign communication protocols or networks which support primarily, or exclusively, one-way communication messages. Thus, prior art replication systems and methods cannot be backboned across a foreign network such as the Internet. Because the present invention only requires one-way, unacknowledged communications between replica nodes, the present invention can utilize a mixture of data networks in order to achieve data replication. Thus, the present invention can backbone replication data across networks such as the Internet. Message transport agent 20 can therefore comprise virtually any mix of network hardware and/or network control software. A good analogy of the functionality required in message transport agent 20 by the present invention is the ability to deliver a message to a designated list of replica nodes in much the same way that an E-mail message is delivered to a list of intended recipients.

While the primary objective of the present invention is to be able to utilize one-way, unacknowledged communication messages in order to replicate data across a replication enterprise, if some feedback information is available from message transport agent 20, the present invention could be modified to utilize such information. For example, most E-mail systems provide feedback to the user if an E-mail message is undeliverable. Although not required, if an analogous piece of information was available from message transport agent 20, the present invention could be modified to utilize such information. Presently, however, it is preferred that no such feedback information will be needed or utilized.

The present invention can be used to replicate any type of information across an enterprise. For example, the present invention can be used to replicate data objects such as word processing documents, spreadsheets, data files, and the like. A group of one or more data objects replicated as a unit across the enterprise is called a "data set." A local copy of a data set is often called a "replica."

In some sense, a data set can be thought of as a container which holds one or more data objects similar to the way a folder holds documents or a computer directory holds computer files. A data set is defined by various properties such as: a common name and/or an ID value; access control information, which specifies which users will be able to access, create, and/or modify the data objects and/or the properties of the data set; a list of replica nodes which have a copy of the populated data set; and any other information that is useful or needed to describe various properties of a data set. The properties of a data set can be replicated independent of the contents of a data set.

Obviously, the group of properties that are used to describe a data set is implementation specific and is defined by factors such as the replication environment and the data being replicated. In one preferred embodiment, data set properties comprise:

| Data Set Name | Data Set ID | Replica List | Change Number | Time Last Modified |
|---|---|---|---|---|

In the above, the data set name is a name of the data set that can be displayed to users. The data set ID is an ID value which uniquely identifies the data set across the entire replication enterprise. The replica is the list of replica nodes which have copies of the data objects in the data set. The change number is an identifier that acts essentially as a version number for the data set properties (a new change number is assigned whenever any of the data set properties are changed and each change number is unique across the enterprise.) The time last modified is the time that the change occurred. The generation of unique identifiers for things such as the data set ID and the change numbers is discussed below. The change number and time last modified stamp are useful in resolving conflicts between various versions of data set properties for the same data set as described below.

In addition to the above properties, other information can also be included in the data set properties. For example, the data set properties can also comprise access control information for the data set. The access control information is used to define the access privileges of various users such as no access, read only access, read/write access, or any other type of access privilege such as the ability to change the data set properties.

As another example, the data set properties can also comprise parent information if the data sets are organized into a hierarchy such as computer directories or a folder tree of an E-mail system. The parent information defines the hierarchical structure of the data sets. For more information regarding replication of hierarchical data, see copending U.S. patent application Ser. No. 08/679,209, entitled "System and Method for the Distribution of Hierarchically Structured Data in a Store and Forward Replication Process," incorporated herein by reference.

As yet another example, other information useful for particular functions associated with data replication such as change sets (used to recover missing data) and predecessor change lists (used to identify conflicts) may also be included. Recovery of missing data is described in copending U.S. patent application Ser. No. 08/670,588, entitled "System and Method for Discovery Based Data Recovery in a Store and Forward Replication Process" (hereinafter the "Backfill Application"), incorporated herein by reference. Conflict detection and resolution is described in copending U.S. patent application Ser. No. 08/673,161, entitled "System and Method for Distributed Conflict Resolution Between Data Objects Replicated Across a Computer Network" (hereinafter the "Conflict Resolution Application"), incorporated herein by reference.

In a preferred embodiment of the present invention, the store and forward replication process replicates both data objects and data set properties across the enterprise. Data objects and data set properties are broadly referred to as replica objects. As the replica objects are received by a replica node and processed, they may be kept in a list or store such as replica object list 22 of FIG. 2. Replica object list 22 can represent either a list of data objects, in which case replica object list 22 would be a data set, or a list of data sets, in which case replica object list 22 would be a data set list. Replication of data set properties and data objects are conceptually identical, if you think of replication as the process of distributing copies of the contents of a container of data. When a data set list is the container, the contents of the container are data sets (as defined by their data set properties). When a data set is the container, the contents of the container are data objects.

Because the properties of the data sets and the data objects of the data sets are replicated separately, some replica nodes may have "populated" data sets (a data set with its data objects) and some replica nodes may have "unpopulated" or "empty" data sets (only the data set properties). As previously described in one embodiment, the replica nodes with a copy of a populated version of a particular data set are kept on a replica list which is stored as a property of the data set. Similarly, the data set properties of the data sets in the enterprise may be replicated to some or all of the replica nodes in the enterprise. If the data set properties of one or more data sets are replicated to less than all the replica nodes in the enterprise, it may be desirable to maintain distribution lists, similar to the replica lists, for these data sets. If all data set properties are replicated to all replica nodes, no such lists need be kept.

In accordance with the present invention, each replica node in the enterprise keeps track of locally made changes to the replica objects in the replica object list. This means keeping track of locally made changes to both data objects and data set properties. The asynchronous store and forward data replication process then periodically broadcasts new changes which have been made since the last broadcast interval to all other replica nodes having a copy of the replica object. Thus, the fundamental basis for asynchronous store and forward data replication is the broadcasting and receiving of one-way, unacknowledged communications containing changes which have been made to the local replica objects. Changes include, for example, creation of new data, modification of existing data, or deletion of existing data. In the case of data set properties, it is unlikely that a particular implementation would allow total deletion of a data set property. Some embodiments may, however, allow deletions of portions of lists or something similar. When these changes are received by other replica nodes, their local copies of the replica object can be updated so that all replica nodes have a current version of the replica object.

If the data set properties are replicated independently of the data sets themselves, then it may be desirable to set up a different replication schedule for the data set properties than the replication interval schedule used for the data objects. In such an embodiment the data set property replication interval could be set relatively small, such as 5 minutes, while the data object replication interval could be set at a relatively longer time, such as 15 minutes.

Establishing a short replication interval for data set properties minimizes the time it takes for changes to replica lists to propagate around the network. This improves the time for administrative changes to take effect such as adding a replica of a data set to a replica node, moving a replica from one replica node to another, or removing a replica from a replica node. Administrative changes such as these and a method for updating and maintaining replica lists as new information is received are discussed in greater detail in copending U.S. patent application Ser. No. 08/679,054, entitled "Replica Administration Without Data Loss in a Store and Forward Replication Enterprise," incorporated herein by reference.

Since the fundamental basis of the present invention is the sending and receiving of one-way, unacknowledged communication messages, embodiments within the scope of the present invention can comprise means for receiving one or more one-way, unacknowledged communication messages. In FIG. 2 such means is shown, for example, by received data packet processing block 24. As indicated in FIG. 2, message transport agent 20 delivers received data packets, as for example received data packet 26, to the local replica node. Received data packet 26 comprises new changes made to replica objects by other replica nodes. In one preferred embodiment, received data packet 26 comprises complete copies of the replica objects which have been changed since the last replication interval by a single replica node rather than a list of changes made to the replica objects.

In embodiments where both data objects and data set properties are replicated around the enterprise, received data packet 26 and transmit data packet 34 must accommodate both data objects and data set properties. This can be accomplished in any desired manner such as having two different types of data packets or having one data packet with a format flexible enough to accommodate both data objects and data set properties. In a preferred embodiment, the data packet comprises:

| Sending Replica Node ID | Distribution List for the Packet | Data Set ID | Change Set Included | Change Set Available | Data Field |
|---|---|---|---|---|---|

The sending replica node ID is an identifier which uniquely identifies the sending replica node across the replication enterprise. Any form of identifier will suffice as long as it uniquely identifies the replica node across the enterprise. In one preferred embodiment, the ID is a Globally Unique ID (GUID) generated as described below.

The distribution list for the packet is a list of replica nodes which should receive this packet. Since packets are distributed similar to the way in which E-mail messages are distributed, with a copy of the packet being delivered to each replica node on a distribution list, it may be desirable to include the distribution list directly in the packet.

The data set ID is an identifier which uniquely identifies the data set of the data which is included in the packet. Again, the ID can be of any type or form as long as the ID uniquely identifies the data set. In one embodiment, the data set ID is a Fast Unique ID (FUID), generated as described below.

The change set included is the change set for the data which is included in the packet. The concept of a change number was introduced previously. In one preferred embodiment, whenever a change is made to a replica object, a change number is assigned to that change. If this change number is unique, (such as a FUID), the change number will uniquely identify a particular change made at a particular replica node. Over time, a series of change numbers will likely be assigned by a particular replica node for a particular data set or data set properties. This series or range of changes is defined by a change range, which is identified by a minimum and maximum change number and is inclusive of the minimum and maximum change number. A change set is one or more change ranges. The change set included is thus one or more change ranges which identify which changes are included in the data being transferred.

The change set available contains one or more change ranges which identify all the changes which are available on the sending replica node. As previously introduced, each replica node keeps track of locally made changes and then periodically broadcasts to other replica nodes all new changes which have been made since the last replication broadcast. As these changes are received and used to update the replica objects of these other replica nodes, the other replica nodes also have the changes. Thus, the replica objects stored on a replica node reflect not only the changes made locally, but also the changes made elsewhere. If the change set for the data contained in each replication broadcast is sent along with the data, each replica node can build a change set that describes all changes that form the basis for the present replica objects held locally. This change set is the change set available that is included in the data packet.

Change numbers, change ranges and change sets make it easier to perform other functions relating to data replication such as resolution of conflicts between two versions of the same replica object and recovery of missing data. These functions are covered specifically in copending applications, but are summarized below as appropriate.

The data field is the actual data transferred in the packet. Any method of formatting the data can be used. However, to reduce packet size, care should be given to reduce the number of bits used to represent the data. The type and format of the data will depend on the specific implementation of the replication system. In one preferred embodiment, complete copies of the changed replica objects are included. Such a scheme greatly simplifies other tasks associated with data replication such as resolution of conflicts between two versions of the same replica object and recovery of missing data. When the data to be transferred is hierarchical in nature, the data may be formatted as described in copending U.S. patent application Ser. No. 08/679,209, entitled "System and Method for the Distribution of Hierarchically Structured Data in a Store and Forward Replication Process," previously incorporated by reference.

Even though transfer of an updated replica object is preferred, the present invention may also include embodiments which transfer a list of changes made to a replica object, although this will make some functions such as resolution of conflicts between objects and recovery of missing data more difficult.

Received data packet processing block 24 basically extracts the replica objects or changes in received data packet 26 and updates the appropriate replica objects in replica object list 22. In FIG. 2, this is illustrated by arrows 28. Processing incoming packets basically requires packet processing block 24 to recognize the incoming packet as a replication packet (as opposed to some other type of packet like normal E-mail), and then process the packet so that the appropriate replica objects are updated and the appropriate information is stored without data loss. Unless it can be guaranteed that one incoming replication packet can be fully processed before another arrives, it may also be desirable to have an incoming packet store or queue where packets can be stored until they are fully processed. Finally, it is important to note that all received data is not fully "owned" by the receiving replica node until the packet has been fully processed. Thus, if processing is interrupted due to a system crash or other unforeseen event, it may be necessary to reprocess the packet.

Although FIG. 2 only illustrates one type of replication packet (a data packet), in order to achieve other replication functions which are not a specific part of this application, many more packet types may be used. For example, in a store and forward replication process, all messages are one-way and unacknowledged. This gives rise to the possibility that some data packets may be transmitted but never received. To guard against such an occurrence, it may be desirable to have in place a method of discovering and recovering missing data. Such methods are discussed in the copending Backfill Application. One method of recovering lost data disclosed in the Backfill Application utilizes four replication packet types: a data packet, a data request packet, an information packet, and an information request packet.

If the present invention is utilized in conjunction with a data recovery process which uses multiple packet types such as those described in the Backfill Application, then it may be desirable to process the packets by packet type rather than on a first come basis. In one embodiment received replication packets are stored in an incoming packet store and processed in the following priority (highest to lowest): Requests to supply missing data, requests for the local change set, data packets containing data set properties, data packets containing data objects, information packets containing the change set from another replica node. It should be noted that successful replication does not generally depend on processing packets in any particular order, but establishing a logical priority may improve the efficiency of the replication process.

If multiple replication packets types will need to be differentiated, embodiments within the scope of this invention may comprise means for distinguishing between multiple replication packet types. By way of example, and not limitation, such means may comprise a packet type identifier included in the packet. In order to distinguish between data packets containing data set properties and data packets containing data objects, such means can comprise the data set ID value described above. For data packets containing data objects, the data set ID is the identifier of the data set which contains the included data objects. Similarly, an ID value could be assigned to the data set list, which contains the properties of all data sets in the enterprise. If the data set ID value was equal to this data set list ID value, then the receiving replica node would know that the data packet contained data set properties. If a particular embodiment had several different lists of data set properties, then all such lists could be identified by checking for the appropriate ID values.

In updating replica object list 22 with the changes received in received data packet 26, care must be taken to only update older versions of the replica objects with more recent versions of the replica objects. Thus, embodiments within the scope of the present invention can comprise means for determining when a replica object should be updated.

The means for determining when a replica object should be updated can comprise a wide variety of ways which can differentiate older versions of an object from new or versions of an object. Any method of differentiating between older and newer versions of a replica object can be used with this invention. Such methods may include, for example, direct comparison of the replica objects, comparison of object time stamps, or any other method. The preferred method, however, is to assign a unique change identifier (change number) to each replica object so that different versions of the same replica object can be identified. In addition, it may also be desirable to keep a change history with the replica object so that the most recent version of the replica object can be quickly and easily identified. If, for example, a change history containing enough information to identify which prior changes form the basis for the current state of the replica object, then by comparing change histories of two or more different versions of a replica object, the most recent version of the replica object can be identified. Thus, the means for determining when a replica object should be updated can also comprise means for comparing change histories.

How change histories can be used to identify the most recent version of a replica object is bound up in what such change histories represent. In the preferred embodiment such change histories include information to identify which change numbers (i.e., changes) form the basis for the present state of the replica object. In other words, the change history is like a revision history in that it tracks which changes have been made to the current replica object. The present invention provides a unique way to generate change identifiers, often called change numbers, so that the amount of data that needs to be stored in the change history can be reduced.

As disclosed in greater detail below, it is presently preferred that unique IDs be generated by concatenating a replica node ID which uniquely identifies a particular replica node with a local counter value. The local counter value is then incremented whenever a unique ID value, such as a unique change identifier, is assigned by a particular replica node. If unique change identifiers, often called change numbers, are assigned in this way, then a given change number from a particular replica node necessarily is based on all prior change numbers assigned by that replica node. Similarly, one change made to a replica object by a particular replica node is necessarily based on all previous changes made by that replica node. Thus, in order to identify a complete change history only the largest change numbers from each replica node need be saved. This type of change history is sometimes called a predecessor change list.

An example of how change numbers and predecessor change lists can be used to identify the most recent version of a replica object may be helpful. Suppose the local object had a change number of B10 and a predecessor change list of B10, C10, and F20. (In this example, the letters represent the unique replica node ID, called a Globally Unique ID or GUID, and the number represents the local counter value.)

Now suppose the received object had a change number of F20 and a predecessor change list of B7, C10, and F20. In this case, it is easy to tell that the local object is newer than the received object since the local object has change B10 which necessarily includes change B7. One replica object is a newer version of another object only if one predecessor change list completely contains the other predecessor change list. One predecessor change list completely contains another if every entry in the one predecessor change list is greater than or equal to the corresponding entry in the other. For example:

F20, G3, H90 contains F7, G3, H90
A8, C25, D1 contains A3, C5, D1
But:
F20, G3, H89 does not contain F7, G3, H90
A10 does not contain A10, B10

In these last two cases a conflict exists between the two objects.

The examples above illustrate that change numbers and change histories can also be used to detect conflicts between conflicting versions of replica objects. In general replica objects are in conflict when they are not based on common changes. In the examples above, a replica object with a change list of F20, G3, H89 would conflict with a replica object with a change list of F7, G3, H90 because each has a change that the other did not (F20 in one case and H90 in the other). Similarly, a replica object with a predecessor change list of A10 conflicts with a replica object with a predecessor change list of A10, B10 because the A10 object has no B10 entry.

After replica objects have been received and a determination has been made about whether the received replica objects are newer than, older than, or in conflict with stored replica objects, appropriate action should be taken. If the received data is older than stored data, it can be discarded. If the received data is newer than the stored data, the newer received data replaces the older stored data. If, however, there is a conflict between the received replica objects and the stored replica objects, the conflict must be resolved during processing of the received objects.

Although not a specific part of this invention, conflicts between different versions of replica objects inevitably arise. Therefore, for robustness, many implementations of store and forward replication will include some sort of conflict detection and resolution procedure. Adequate methods of conflict resolution are described in the copending Conflict Resolution Application. The Conflict Resolution Application describes in greater detail how change numbers and change histories can be used for conflict detection and resolution.

In conformity with the present invention, each replica node keeps track of locally made changes. The new changes which have occurred since the last replication broadcast are then broadcast to all other replica nodes having the replica. Embodiments within the scope of this invention can therefore comprise means for sending one or more one-way, unacknowledged communication messages. In FIG. 2, such means is illustrated, for example, by transmit data packet processing block 32. Transmit data packet processing block 32 bundles the changes made since the last replication broadcast to the replica objects in replica object list 22 and broadcasts them to other replica nodes also having a copy of the replica objects in transmit data packets such as transmit data packet 34. Transmit data packet 34 is then delivered to message transport agent 20 along with a list of replica nodes which should receive the packet. Transmit data packet 34 can have the format and include the information previously described in conjunction with received data packet 26.

As previously discussed in conjunction with received data packet 26, it is presently preferred that transmit data packet 34 contain complete copies of the changed replica objects rather than simply a list of changes made to a replica object. This is preferred in order to simplify other aspects relating to data replication such as recovery of data lost during transmission and resolution of conflicts between various versions of the same replica object. These functions are not part of the present invention, but they are related to data replication and are described in greater detail in the Backfill Application and Conflict Resolution Application, respectively.

As should be abundantly clear by now, the local replica node tracks changes made locally to replica objects in replica object list 22. For example, if replica object list 22 was a replica of a data set that contained a word processing document then, as a user edited and modified the word processing document, the modified document would be placed into the replica for later distribution by transmit data processing block 32. A similar process would occur if replica object list 22 was the data set list and the properties of a data set were modified. In FIG. 2, the process of changing and updating replica objects in replica object list 22 is illustrated by local processing block 36. Local processing block 36 represents whatever means is used to modify and store local replica objects. For example, local processing block 36 can comprise a word processing program, a spreadsheet program, a text editor, an E-mail program, or any other program or means to create, modify, or delete data objects or data set properties.

As previously discussed in conjunction with received data packet processing block 24, embodiments within the scope of this invention can comprise means for determining when a replica object should be updated. Such means can comprise, for example, means for associating a unique change identifier with a locally changed copy of a replica object. Thus, as previously described, the unique change identifiers, and possibly a change history, of a received replica object can be compared to the unique change identifier, and possibly a change history of a local replica object in order to determine whether the local replica object should be updated with the received replica object. Furthermore, the means for determining when a replica object should be updated can also comprise means for associating the unique identifier with a particular replica object. Associating a unique identifier with a particular replica object will allow corresponding copies of the replica object on various replica nodes to be identified. When a replica object is received at a local replica node, the identifier can be compared with copies of replica objects in replica object list 22 in order to identify which replica object in replica object list 22 corresponds to the received replica object, if any.

Obviously, if unique identifiers are to be associated with a particular replica object, or with a particular change made to a replica object, then embodiments within the scope of this invention can comprise means for generating a unique ID. In FIG. 2, such means is represented by fast unique ID generation block 38. One type of unique IDs used throughout this invention are often referred to as Fast Unique IDs (FUIDs). Any method of generating identifiers which are unique across the entire enterprise will work with this invention. However, it is presently preferred that FUIDs be generated by concatenating a Globally Unique ID (GUID), which uniquely identifies a particular replica node among all replica nodes in the enterprise, with a locally unique ID, which may or may not be unique across the enterprise, such as a local counter value. Means for generating unique IDs can therefore comprise means for generating a globally unique ID and means for generating a locally unique ID.

Figure 3:
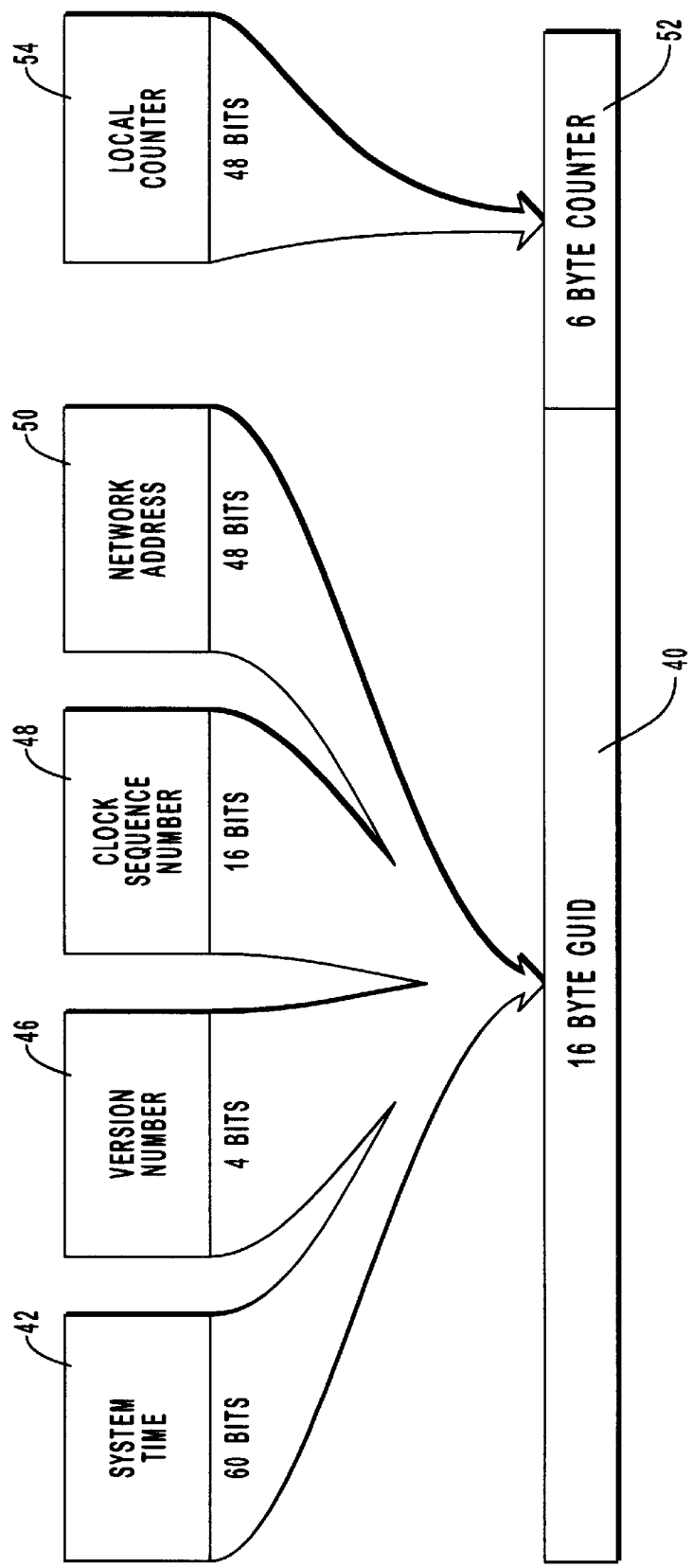
FIG. 3 is a diagram illustrating generation of unique identifiers in accordance with the present invention.

Turning next to FIG. 3, a preferred method of generating FUIDs is presented. As previously described, a FUID preferably comprises a GUID value, which uniquely identifies a replica node among all other replica nodes in a replication enterprise, concatenated with a local counter value. The range of GUID values available must obviously be large enough to uniquely identify the maximum number of replica nodes which will be contained within an enterprise. Preferably, however, the range of GUID values is much, much larger than the maximum number of replica nodes which will be contained within an enterprise. Furthermore, the local counter value is preferably large enough to avoid a short term rollover problem. In the preferred embodiment, the GUID value is 16 bytes long and the local counter value is 6 bytes long for a FUID which is 22 bytes long. FIG. 3 illustrates the various components of the preferred 22 byte FUID.

Focusing first on the 16 byte GUID value, shown in FIG. 3 as 40, an explanation of one preferred method of generating the GUID is presented. First, it should be noted that any method of generating a GUID which uniquely identifies a particular replica node among all replica nodes in the enterprise can be utilized with this invention and all are examples of the means for generating a globally unique ID. In the preferred embodiment illustrated in FIG. 3, however, the 16 byte GUID value has four components. The first component is a 60 bit system time value. This is illustrated in FIG. 3 as system time block 42. The system time represents the time at which the GUID is generated. In a preferred embodiment, this system time represents the lower most 60 bits of the number of 100 nanosecond intervals since Jan. 1, 1601. Any measure of system time would be acceptable as long as the system time was at least 60 bits long and had sufficient resolution to avoid overlap between successively generated GUID values.

The next component of GUID value 40 is 4 bits of version number. This is illustrated in FIG. 3 by version number block 46. The version number block can be used to identify which version of a GUID generator has generated the current GUID value. Presently, this value is always set to one.

The next component of GUID value 40 is 16 bits of clock sequence number. This is illustrated in FIG. 3 by clock sequence number block 48. The clock sequence number is simply a counter which is incremented every time a GUID value is generated by a particular replica node. The purpose of such a counter is to provide a changing component of the GUID value which does not depend on system time. It further serves to randomize the GUID value and ensure that GUIDs generated by individual replica nodes throughout an enterprise are unique with respect to each other.

Finally, the last component of GUID value 40 is 48 bits of network address. This is illustrated in FIG. 3 by network address block 50. The 48 bits of network address are preferably hard coded into the replica node. Such a network address is often hard coded on a network card which is used to physically connect the replica node to other replica nodes in the enterprise. Network addresses are typically assigned so that they are unique throughout an enterprise, or at least unique within a site.

GUIDs generated as disclosed above may be used for the replica node ID values described previously in conjunction with a data packet. GUIDs generated as described above may also be used anytime a unique replica node ID value is needed.

By combining the above four components (system time, version number, clock sequence number, and network address), a 16 byte value which is unique across the replication enterprise can be generated. Furthermore, because of the way that FUIDs are generated by concatenating a GUID value with a local counter value, the process of generating GUID values will be used relatively infrequently. In fact, the process will primarily be used when a replica node is initially connected to the enterprise. Thus, the process of generating GUID values can be a relatively long process since it is used so infrequently. An implementation of a process which generates GUID values as explained above can be obtained from Microsoft Corporation. The implementation resides in the Windows 32 bit software development kit (WIN32SDK) as a program called UUIDGEN.

As a final matter, since the 16 byte GUID value is much larger than the actual number of replica nodes in any given replica enterprise, the 16 byte GUID value can be compressed and stored locally in a shortened form. For example, if there are fewer than 65,536 replica nodes in an enterprise then a table can be created which uses a two byte index value to index a table of 16 byte GUID values. Thus, the storage space required to store individual GUID values can be reduced from 16 bytes each to 2 bytes each (plus the space needed to store the table).

Returning now to FIG. 3, appended to GUID value 40 is a local counter value illustrated as 6 byte counter 52. The length of the counter value is relatively unimportant as long as the length is sufficient to avoid a short term rollover problem. Rollover should be avoided in order to ensure unique ID values. Because GUID values are unique and because the local counter values are only assigned or used once, the entire FUID value is unique. When the counter value does reach its maximum value, reuse of ID values can be prevented by generating a new GUID value and resetting the counter value to zero. As illustrated in FIG. 3, counter value 52 is generated by a local counter illustrated by local counter block 54.

The process of concatenating a local counter value with a GUID value creates many advantages. This method makes it easy to generate large, unique ID values extremely quickly. These values are guaranteed to be unique across an entire enterprise since the GUID value is unique. By using this structure, the replica node need simply increment the counter each time a unique ID is desired. The process of generating unique IDs can be speeded up even further if the counter value is incremented in blocks so that blocks of unique ID values are allocated. Once a block of ID values has been allocated, they can then be distributed very rapidly from memory without the need to store the counter value in a safe place, such as the local computer disk, between increments in order to prevent loss of the counter value due to an abrupt power or system failure.

In summary, the present invention provides a system and method for asynchronous and store and forward data replication which takes advantage of currently installed hardware and network configurations as a message transport agent to deliver one-way, unacknowledged communications between replica nodes. The replication method of the present invention has a significant advantage over current systems in that it can utilize foreign networks such as the Internet or other wide area networks to replicate data over long distances between vastly separated local networks. The store and forward replication process can be used to replicate any type of data including both data objects and data set properties.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for replicating data among multiple nodes in a network, the method comprising the steps of:
   keeping at a local replica node a local copy of a replica object also replicated at one or more other replica nodes in a network;
   updating said replica object each time changes are made to said replica object locally or received, via one or more unacknowledged communication messages, from said one or more other replica nodes; and
   associating a unique change identifier with every change made to said replica object, wherein the unique change identifier is generated by a method comprising the steps of:
      assigning to each replica node in the network a globally unique identifier which is unique across the network; and
      concatenating with said globally unique identifier a counter value which is incremented when a new unique change identifier is needed.

2. A method for replicating data as recited in claim 1 further comprising the step of sending to said one or more other replica nodes at least one message comprising a local copy of said replica object which has been changed at said local replica node.

3. A method for replicating data as recited in claim 1 wherein the changes received from said one or more other replica nodes comprise a received copy of the replica object incorporating changes made to said replica object.

4. A method for replicating data as recited in claim 3 further comprising the step of determining whether the received copy of the replica object should replace said local copy of the replica object.

5. A method for replicating data as recited in claim 4 further comprising the step of replacing said local copy of the replica object with said received copy of the replica object if said received copy is a later version of said replica object.

6. A method for replicating data as recited in claim 1 further comprising the step of associating with the replica object a unique identifier so that the replica object can be uniquely identified by all nodes in the network.

7. A method for replicating data as recited in claim 1 wherein the replica object comprises data set properties.

8. A method for replicating data as recited in claim 1 wherein the replica object comprises one or more data objects.

9. In a computer network wherein copies of replica objects are replicated, distributed and stored at one or more replica nodes, a method for replicating data among said one or more replica nodes comprising the steps of:
   updating, at each replica node, a locally stored replica object each time changes are made locally to said replica object or received from one or more other replica nodes;
   transmitting, periodically from each replica node, a copy of said locally stored replica object incorporating changes made to said replica object, to other replica nodes by way of at least one unacknowledged message; and associating a unique change identifier with every change made to said replica object, the unique change identifier being changed whenever further changes are made to the replica object such that the unique change identifier continues to be unique, wherein the unique change identifier is created using a method comprising the steps of:

assigning to each replica node in the network a globally unique identifier which is unique across the network; and concatenating with said globally unique identifier a counter value which is incremented when a new unique change identifier is needed.

10. A method for replicating data as recited in claim 9 further comprising the step of associating a replica list with the replica object, said replica list comprising a list of all replica nodes which have a copy of said replica object.

11. A method for replicating data as recited in claim 9 further comprising the step of associating with the replica object a unique identifier so that the replica object can be identified by all replica nodes in the network.

12. A method for replicating data as recited in claim 9 wherein said locally stored replica object comprises data set properties, said data set properties comprising an identifier for said data set, and a replica list for said data set.

13. An article of manufacture for use in a computer system defining a location in a network where a copy of a designated replica object is replicated, said computer system being logically connected to at least one other computer system through networking means, each computer system comprising a CPU, said article of manufacture comprising:

program storage means, accessible by the CPU, for storing and providing, to the CPU, program code means, said program code means comprising:

means for sending one or more one-way, unacknowledged communication messages comprising a locally changed copy of a replica object to one or more other systems; and means for receiving one or more one-way, unacknowledged communication messages comprising a copy of the replica object changed at said one or more other systems; and means for generating a fast unique ID which is unique across all systems in the network, the means for generating a fast unique ID comprising:

means for generating a globally unique ID which uniquely identifies the computer system across all systems in the network; and means for generating a locally unique ID which is unique among all other locally unique IDs, said locally unique ID being concatenated with said globally unique ID.

14. An article of manufacture as recited in claim 13 wherein the program code means further comprises means for determining when the replica object should be updated.

15. An article of manufacture as recited in claim 14 wherein the means for determining when the replica object should be updated comprises means for associating a unique ID with the locally changed copy of the replica object.

16. An article of manufacture as recited in claim 14 wherein the means for determining when the replica object should be updated comprises means for comparing change histories.

17. An article of manufacture as recited in claim 13 further comprising means for associating a unique ID with the replica object.

* * * * *

UNITED STATES PATENT AND TRADEMARK OFFICE
CERTIFICATE OF CORRECTION

PATENT NO. : 5,812,793
DATED : Sep. 22, 1998
INVENTOR(S) : Shakib et al.

It is certified that error appears in the above-identified patent and that said Letters Patent is hereby corrected as shown below:

Col. 1, line 25, before "resources" change "information" to --informational--

Col. 3, line 19, after "terms" change "is" to --are--

Col. 6, line 37, after "labeled" change "A-E" to --A-F--

Col. 6, line 47, after "and" change "encompasses" to --encompass--

Col. 10, line 16, after "such as" change "15minutes" to --15 minutes--

Col. 17, line 55, after "asynchronous" delete "and"

Signed and Sealed this

Twenty-third Day of November, 1999

Attest:

Q. TODD DICKINSON

*Attesting Officer*  *Acting Commissioner of Patents and Trademarks*